US006734354B2

(12) United States Patent
McClellan et al.

(10) Patent No.: US 6,734,354 B2
(45) Date of Patent: May 11, 2004

(54) CABLE MANAGEMENT APPARATUS

(75) Inventors: Terry McClellan, Maple Grove, MN (US); Zakhary Bluband, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/117,306

(22) Filed: Apr. 5, 2002

(65) Prior Publication Data

US 2003/0188880 A1 Oct. 9, 2003

(51) Int. Cl.$^7$ ................................................. H02G 3/04
(52) U.S. Cl. ........................ 174/48; 174/135; 174/72 A; 174/100; 385/134; 385/135
(58) Field of Search ............................. 174/48, 49, 50, 174/58, 68.1, 68.3, 135, 95, 99 R, 60, 72 A, 100; 220/3.2, 3.3, 3.8, 4.02, 4.01; 385/134, 135; 211/41; D13/155; 361/827, 823, 824, 825, 829; 248/49, 68.1, 58, 65, 89; 52/220.1, 220.3, 220.5, 220.7

(56) References Cited

U.S. PATENT DOCUMENTS

| | | | | | |
|---|---|---|---|---|---|
| 3,485,937 A | * | 12/1969 | Caveney | ................... | 174/72 A |
| 3,890,459 A | * | 6/1975 | Caveney | ................... | 174/72 A |
| 4,484,020 A | * | 11/1984 | Loof et al. | ................. | 174/68.3 |
| 5,240,209 A | * | 8/1993 | Kutsch | ....................... | 248/49 |
| 5,640,482 A | * | 6/1997 | Barry et al. | ................. | 385/135 |
| 5,825,962 A | * | 10/1998 | Walters et al. | .............. | 385/135 |
| 5,902,961 A | * | 5/1999 | Viklund et al. | ............ | 248/68.1 |
| 6,318,680 B1 | * | 11/2001 | Benedict et al. | ........... | 174/68.1 |
| 6,365,834 B1 | * | 4/2002 | Larsen et al. | ................ | 174/100 |
| 6,380,484 B1 | * | 4/2002 | Theis et al. | ................. | 174/68.3 |
| 6,489,565 B1 | * | 12/2002 | Krietzman et al. | ........ | 174/68.3 |

OTHER PUBLICATIONS

PCI Technologies Inc. "Innovative solutions for Information networks", Catalog #0500, 36 pages, (2000).
PCI Technologies Inc. "Innovative solutions for Information networks", "MAXNET", 8 pages, (Date Unknown).
Declaration of Terry McClellan with Exhibit A, photographs A1–A7 dated Aug. 14, 2002.

* cited by examiner

Primary Examiner—Dean Reichard
Assistant Examiner—Angel R. Estrada
(74) Attorney, Agent, or Firm—Merchant & Gould P.C.

(57) ABSTRACT

A cable management system having as an integral part of the device needing cable management a slot arrangement that receives and holds cables. A lock bar closes the slot arrangement such that the cables are trapped in the slot arrangement. Methods of managing cable include the lock bar and slot arrangement.

16 Claims, 6 Drawing Sheets

FIG.3
FIG. 4
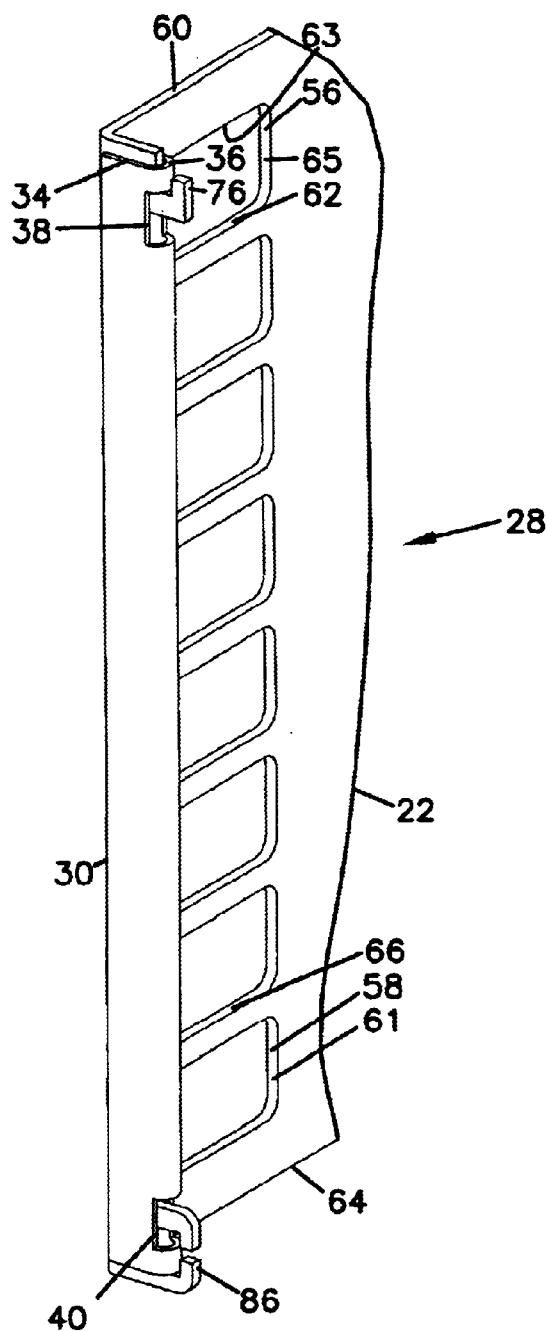
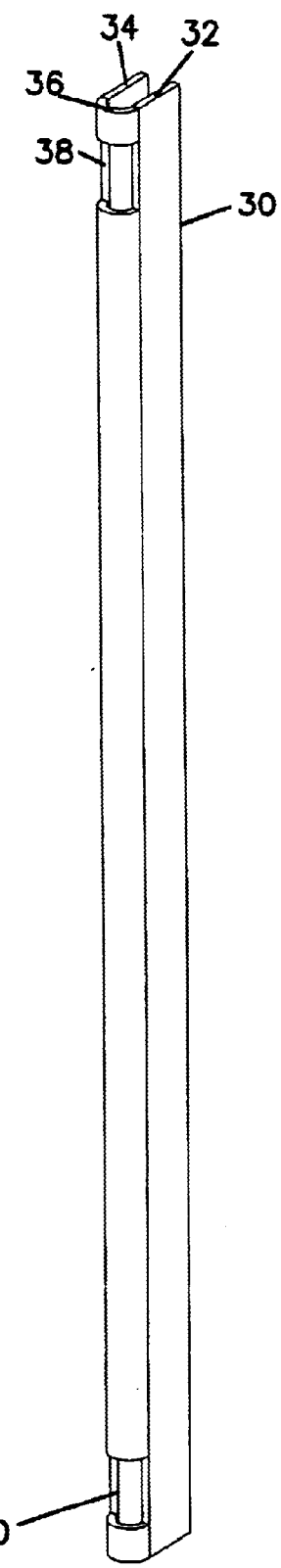

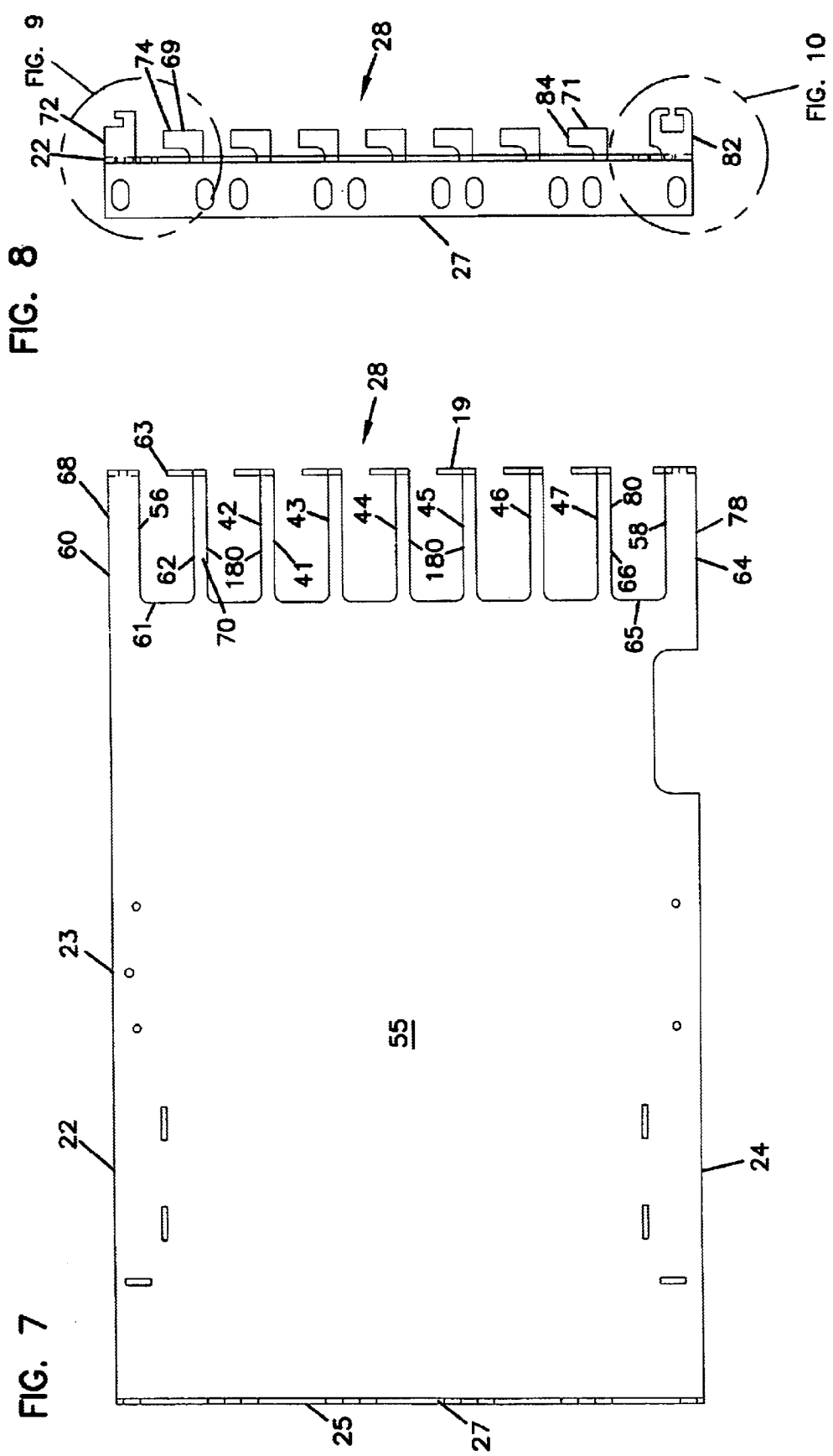

CABLE MANAGEMENT APPARATUS

TECHNICAL FIELD

This disclosure pertains to a cable management arrangement and device. More particularly, this disclosure pertains to a locked bar used with a cable management system.

BACKGROUND

In the telecommunications industry it is necessary to manage large amounts of cables in an organized fashion. For example, U.S. Pat. No. 6,289,210 B1 ('210 patent), commonly assigned hereto, discloses a module for radio frequency signal circuits, which includes a plurality of cables, including coaxial cables. Such systems require cable management. Additionally, equipment is typically organized as efficiently as possible to conserve space and limit the amount of cable necessary to connect equipment. Placing many pieces of equipment in close proximity multiplies the need for an efficient cable management system. Industry has developed many cable management systems to satisfy this need. These prior art cable management systems, however, are complex, expensive to manufacture and require external hardware and installation. Thus, there exists a need for a simple, inexpensive cable management system.

SUMMARY

In one aspect, a cable management arrangement is provided including a slot arrangement that receives and holds cables. An integral, single piece lock bar closes the slot arrangement such that the cables are trapped in the slot arrangement.

In another aspect, a lock bar for use with a cable-management chassis is provided. The lock bar includes an integral, single piece U-shaped construction including at least a first and a second hook-receiving window extending therethrough.

In another aspect, a method of managing cables includes providing a plate defining a plurality of open-ended slots; orienting at least one cable in one of the slots; and closing the plurality of open-ended slots to trap the at least one cable therein by orienting a U-shaped lock bar over the plate.

BRIEF DESCRIPTION OF THE DRAWINGS

FIG. 3 is an enlarged, fragmented perspective view depicting a portion of the cable management chassis of FIGS. 1 and 2.

FIG. 4 is an enlarged perspective view of a lock bar shown in FIGS. 1–3.

FIG. 7 is a side elevational view of one plate of the chassis of FIG. 1 but without the lock bar of FIGS. 4–6 mounted thereon and showing a slot arrangement on an end portion.

FIG. 8 is an end elevational view of the plate of FIG. 7 showing the slot arrangement.

DETAILED DESCRIPTION

With reference now to the various drawing figures in which identical elements are numbered identically throughout, an example embodiment incorporating the principles of the present disclosure will now be provided.

A. Some Problems with Existing Arrangements

There are a number of prior art systems and devices that have been designed to manage cables in an organized fashion. Many existing systems, however, are separate devices that are attached to the equipment needing cable management. These devices are built from many separate pieces that need to be assembled to form the cable management device. For example, such devices may require multiple pieces welded together, threaded holes put into them and other pieces mounted to them using hardware such as bolts and screws. Besides the raw material, manufacture and hardware expense, these complicated devices require installation, which adds to their expense. Many of these devices also contain complex locking mechanisms that hold the cables in place. These locking mechanisms are side specific; that is, they are either right-handed or left-handed. This also adds to expense in that different pieces must be manufactured and used depending on its right or left-handed placement. Improvements are desirable.

B. Overview of Cable Management System of FIGS. 1–11

The present disclosure eliminates much of the expense relating to raw material, hardware, manufacture and installation costs. The present disclosure includes a plate with slots designed to hold cables. The plate receives a lock bar that covers the slots. The lock bar holds the cables in place when the bar is placed over the slots. The lock bar made in accordance with the principles in this disclosure is not side specific, i.e. it is not left or right-handed. Thus, it can be used universally.

Figure 5:
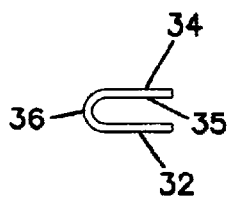
FIG. 5 is an end elevational view of the lock bar shown in FIG. 4.
Figure 6:
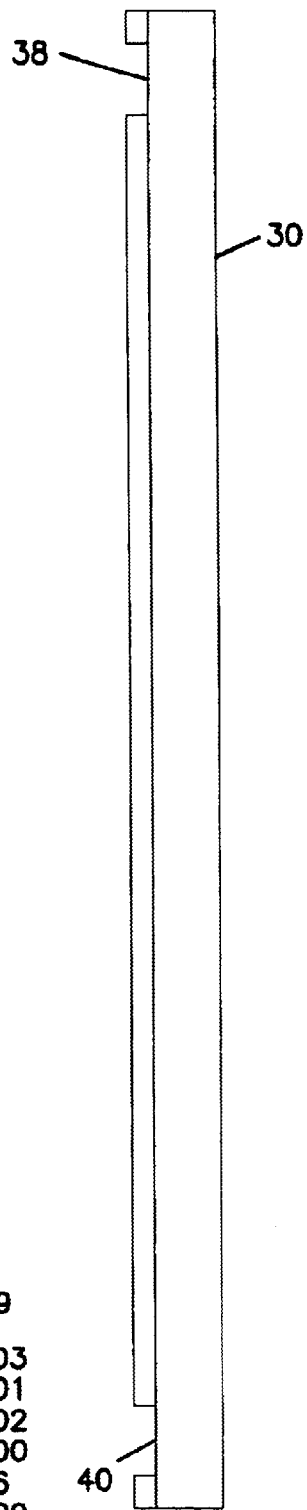
FIG. 6 is a side elevational view of the lock bar of FIG. 4 and illustrating hook receiving windows.
Figure 9:
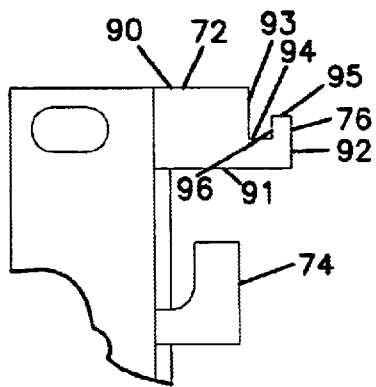
FIG. 9 is an enlarged, fragmented elevational view of one of the slots depicted in FIG. 8.
Figure 10:
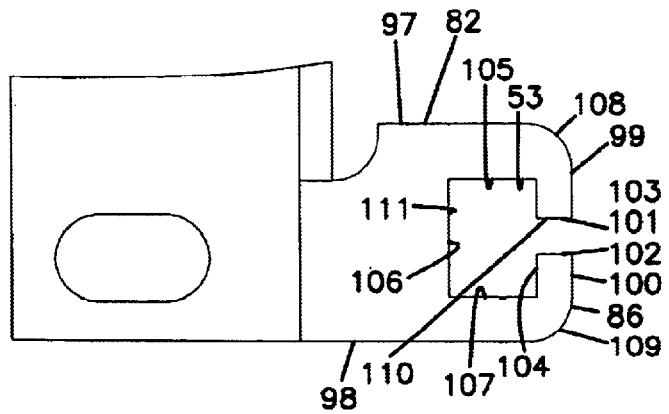
FIG. 10 is an enlarged, fragmented elevational view of another of the slots depicted in FIG. 8.
Figure 11:
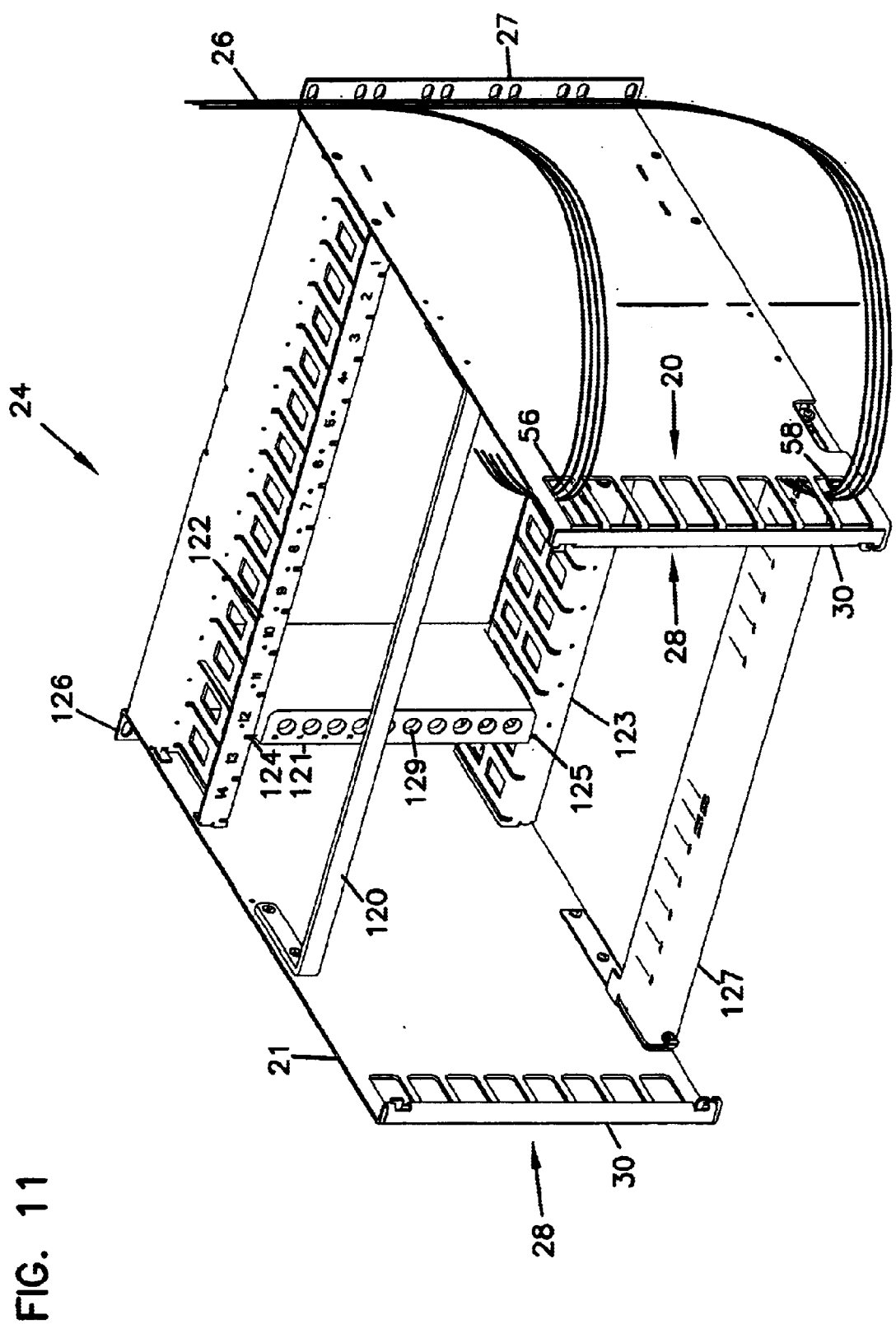
FIG. 11 is a schematic perspective view of the chassis in FIG. 1 showing cables arranged in accordance with the present invention.

FIGS. 1–11 represent an example embodiment made in accordance with the principles of the present disclosure. The example embodiment shown in FIGS. 1–11 is only one of many configurations built in accordance with this disclosure. In the example shown in FIG. 1, there is a cable management system shown generally at 20. The system 20 shown has a plate 22, which, in this particular embodiment, is part of a chassis 24 for holding cable 26 (FIG. 11). The plate 22 defines a slot arrangement 28 for supporting or holding cables 26. A lock bar 30 is removably mounted over the slot arrangement 28 to selectively hold and lock the cables 26 in place on the chassis 24. FIGS. 1–3 and 11 show the lock bar 30 oriented in a locking configuration over the slot arrangement 28, while FIGS. 7 and 8 show the plate 22 with the lock bar 30 removed from the slot arrangement 28. FIGS. 4–6 show the lock bar 30 removed from the slot arrangement 28. Chassis 24 can be mounted to a frame, rack or cabinet through brackets 27 and 127.

C. The Lock Bar, FIGS. 4–6

In reference now to FIGS. 4–6, an example of a lock bar 30 useable with the arrangements disclosed herein is shown. As mentioned above, the lock bar 30 is selectively removably mountable over the slot arrangement 28 of the plate 22. By comparing FIG. 7 (slot arrangement 28 without the lock bar 30) with FIG. 11, it can be seen how the lock bar 30 traps the cables 26 in the slot arrangement 28. Thus, the lock bar 30 could be of many different shapes capable of including at least one hook-receiving window, for example, 38 or 40, such that it can trap cables 26 in the slot arrangement. For example, the lock bar 30 could be an elongate cylinder, a flat bar or even a flexible band that is stretched between hooks to trap cables 26 in a slot arrangement 28.

However, while a number of configurations are contemplated, in the lock bar 30 shown in FIGS. 4–6, the lock bar 30 is an integral, single piece U-shaped elongate body having a first leg 32 and a second leg 34 joined by a bight section 36. By "bight section" it is meant the curved portion of the base of the U-shape. The bight section 36 defines at least one window (38 or 40 in example FIGS. 4–6) such that it can receive a hook shaped object. In the example shown in FIGS. 4–6, the bight section 36 has a first hook-receiving window 38 and a second hook-receiving window 40.

In the example shown in FIGS. 4–6, the lock bar 30 is preferably 30 to 70 inches, more preferably 10 to 30 inches, and most preferably 3 to 10 inches in length. The height of the U-shaped construction is preferably 4 to 10 inches, more preferably 1 to 4 inches and most preferably 0.1 to 1 inches. The width of the U-shaped construction is preferably 1 to 4 inches, more preferably 0.5 to 1 inch and most preferably from 0.1 to 0.4 inch.

(i.) The Legs 32 and 34

In the example shown, the legs 32 and 34 that extend from the U-shaped bight section 36 are substantially parallel to each other. The legs 32 and 34 are straight, continuous the length of the lock bar 30 and non-porous. The legs 32 and 34 could be spaced apart from each other any operable distance; however, in this particular arrangement the width 35 between the legs 32 and 34 is preferably 20%, more preferably 10% and most preferably about 5% of the total length of the lock bar 30. The legs 32 and 34 extend outward from the bight section 36 preferably less than 80%, more preferably less than 70% and most preferably less than 60% of the width between the legs 32 and 34. Yet the legs 32 and 34 extend out from the bight section 36 greater than 40% of the width between the legs 32 and 34.

It should be noted, however, that many leg configurations could trap the cables 26 within the slot arrangement 28. For example, the legs 32 and 34 may have rounded ends such that the lock bar 30 does not scratch or cut the cables 26. The legs 32 and 34 may also be larger or smaller depending on the size and weight of the cables 26 being trapped in the slot arrangement 28. The legs 32 and 34 may be made of many different materials capable of trapping cables 26 in the slot arrangements 28. For example, the legs 32 and 34 could be made of plastic, metal, composite material, wood, or virtually any material or combination thereof that is capable of trapping the cables 26 in the example slot arrangement 28. It is preferred, however, that the lock bar 30 be made of stamped, bent sheet metal.

(ii.) The Bight Section 36

The bight section 36, made in accordance with this disclosure and shown by example in FIGS. 4 and 5, includes the curved U-shaped portion of the lock bar 30 and connects the legs 32 and 34 together. The bight section 36 extends the whole length of the lock bar 30. The bight section 36 could be many shapes, for example, it could be made of a flat section forming 90 degree angles with the legs 32 and 34, or the lock bar 30 could have a bight section 36 made from attaching two legs directly together forming an angle between the two legs 32 and 34. For example, the two legs 32 and 34 could be attached at a 90-degree angle. In the illustrated embodiment the lock bar 30 includes at least one hook-receiving window, 38 or 40. In the example illustrated in the drawings, the lock bar 30 has a first hook-receiving window 38 and a second hook-receiving window 40 that is shown, for example in FIGS. 4–6, as being contained in the bight section 36. In another embodiment, the lock bar 30 may not contain a bight section 36, for example, if the lock bar 30 were made from an elongated cylinder or a tube or other shapes. Thus, illustrating that the example shown in FIGS. 4–6 is just one of many designs contemplated.

(iii.) The First and Second Hook-Receiving Window 38 and 40

Referring now to the example embodiment of FIGS. 4 and 6, the lock bar 30 includes the first hook-receiving window 38 and the second hook-receiving window 40 within its bight section 36. The illustrated embodiment of the lock bar 30 has two hook receiving windows 38 and 40. But the lock bar 30 could include, for example, only one hook-receiving window 38 or 40 or more than two. The first hook-receiving window 38 and the second hook-receiving window 40 extend through the bight section 36 such that an appropriate structure, in the example shown, hooks 76 and 53, can be placed within, received and held by the hook-receiving window(s) 38 and/or 40. It is not necessary, however, as is shown in this example, that the first hook-receiving window 38 and a second hook-receiving window 40 extend totally through the lock bar 30; it is sufficient that the hook-receiving windows 38 and 40 are capable of receiving and holding the hooks 76 and 53. The lock bar 30, once placed over the slot arrangement 28, is held down by gravity such that it cannot slip off the hooks 76 and 86.

In the example embodiment shown in FIGS. 4 and 6, the first hook-receiving window 38 and the second hook-receiving window 40 are placed adjacent the ends of the lock bar 30. For example, the first hook-receiving window 38 and the second hook-receiving window 40, as shown by example in FIGS. 4 and 6, are spaced no more than 10% of the total length of the lock bar 30 from each end. The hook receiving windows 38 and 40 are no more than 10% of the total length of the lock bar 30 in length. They could, however, be placed at any operable location along the lock bar 30. For example, the lock bar 30 may contain one hook-receiving window 38 or 40 in the center or many throughout its length. The particular hook-receiving windows 38 and 40 shown in FIGS. 4–6 are rectangular. The hook-receiving windows 38 and 40, however, can be other shapes.

D. The Plate 22, FIGS. 1–3 and 7–11

Figure 1:
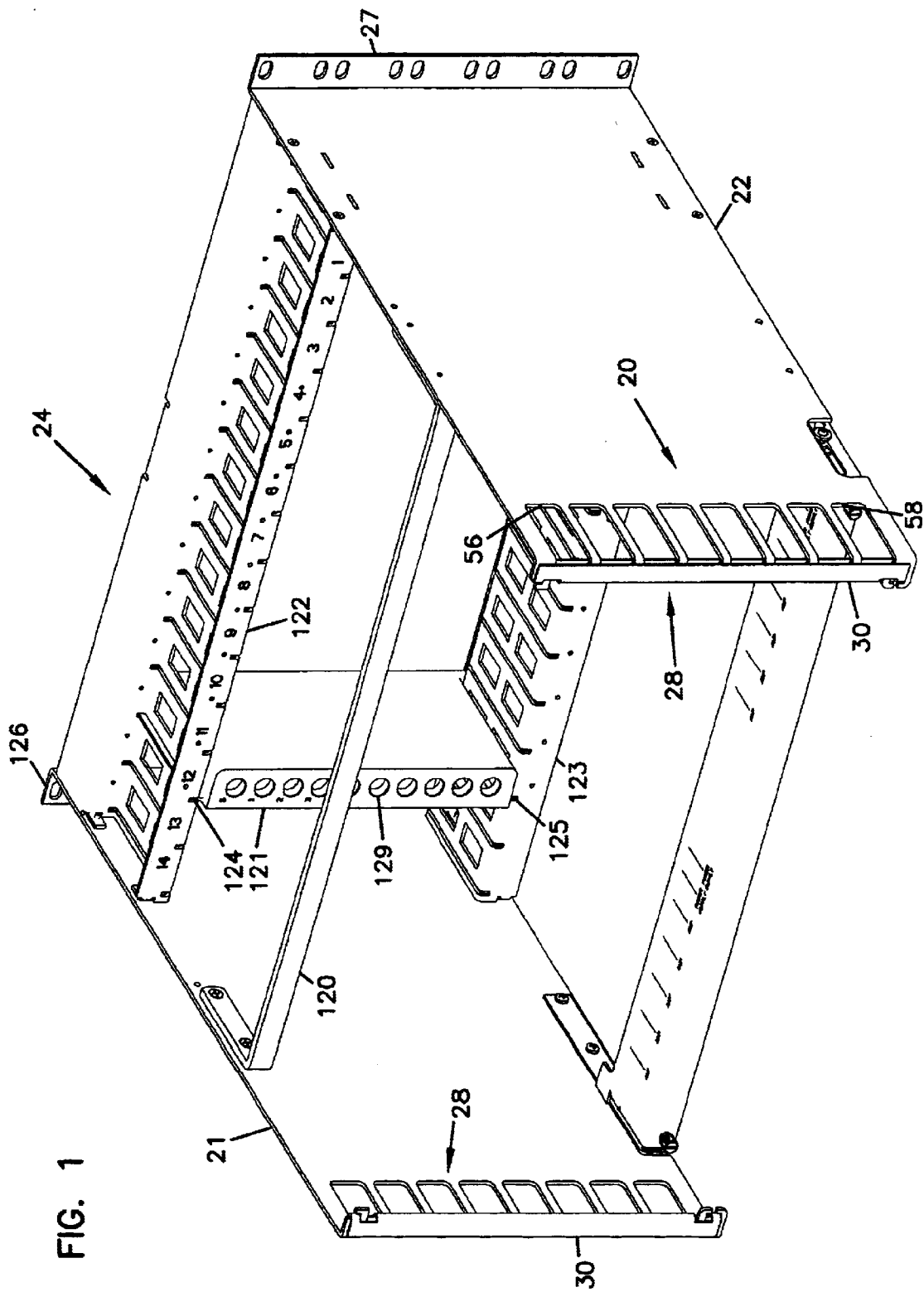
FIG. 1 is a perspective view of one embodiment showing a chassis having an integral cable management arrangement constructed according to the principles of this disclosure.
Figure 2:
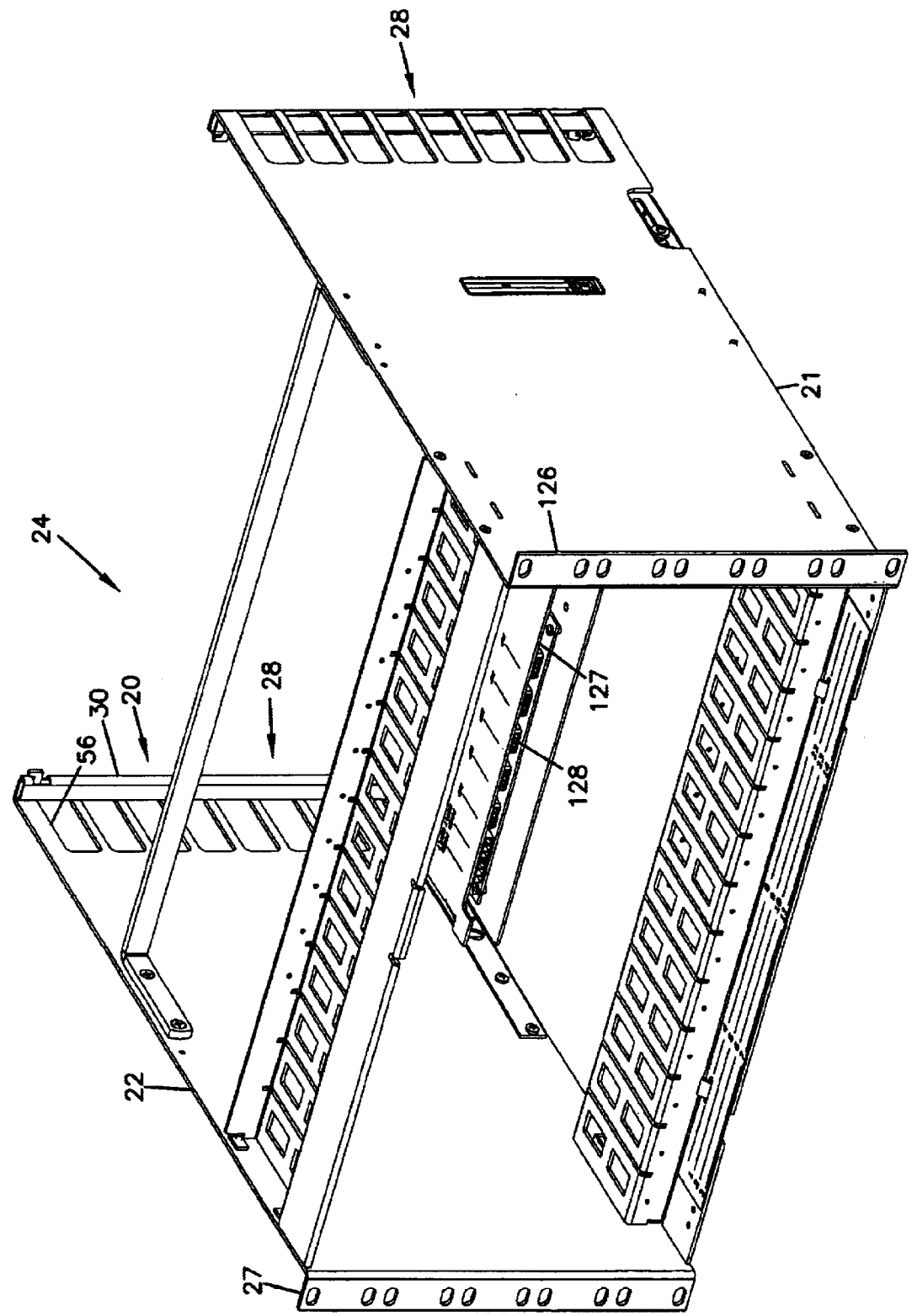
FIG. 2 is a perspective view of the embodiment of FIG. 1 shown from the opposite perspective.

(i) FIGS. 1, 2 and 11

Attention is next directed to the plate 22, which defines the slot arrangement 28. As mentioned above, the slot arrangement 28 holds the cables 26, and the lock bar 30 traps the cables 26 in the slot arrangement 28. In the Figs., the plate 22 is part of the chassis 24. In the particular chassis 24 shown, there are two plates, 21 and 22. Plate 22 is described below. In preferred systems, plate 21 is identical to plate 22.

In the example shown, plate 22 is rectangular in shape. Plate 22 has a first edge 23, a second edge 24, a third edge 25 and a fourth edge 19. Plate 22 is of an operable thickness giving both support to the chassis 24 and the cables 26. The third edge 25 of plate 22 has an integral mounting section 27. By "integral" it is meant that the mounting section 27 is formed through one continuous part of the plate 22. The slot arrangement 28 is located at the fourth edge 19.

As shown, the slot arrangement 28 of the plate 22 is an integral part of the plate 22. The slot arrangement 28 has at least one slot, for example, a slot 56. In the example shown, slot arrangement 28 has the first slot 56, a second slot 58 and a plurality of slots 42–47 (FIG. 7) between slots 56 and 58. It should also be noted that there could be more or less slots 42–47, 56 and 58 depending on the device requiring cable management.

In the embodiment shown, a first arm 60, a second arm 62, and a back portion 65 (FIG. 3) define the first slot 56. Similarly, a first arm 64, a second arm 66, and a back portion 61 define the second slot 58. In the present example, the slots 56 and 58 are rectangular in shape, but the slots 56 and 58 could be any shape that could operably hold the cables 26 and be trapped in place by the lock bar 30.

(ii) FIG. 3

FIG. 3 is an enlarged fragmented perspective view of the plate 22 showing the slot arrangement 28 closed by the lock bar 30. FIG. 3 shows, in part, the arms 60 and 62 extending out from the plate 22 to define the first slot 56. As can be seen in FIG. 3, arms 60 and 62 are parallel, with the back portion 65 extending perpendicular therebetween. Opposite of the back portion 65 and between the arms 60 and 62 is a void 63 (FIG. 7) that permits selective mounting of the cables 26 in the slot 56. Slot 58 is constructed similarly to slot 56.

(iii) FIGS. 7, 8, 9 and 10

Referring next to FIGS. 7 and 8, the arms 60, 62, 64 and 66 of plate 22 are described in further detail. FIG. 7 shows that the arms 60, 62, 64 and 66 have forearms 68, 70, 78 and 80 respectively.

The forearms 68, 70, 78 and 80, in the present example, extend outward substantially straight from the plate 22 and are substantially rectangular in shape. The forearms 68, 70, 78 and 80, however, could extend outward from the plate's 22 plane 55 (FIG. 7) in other operable directions and they could be other operable shapes. The forearms 68, 70, 78 and 80, for example, could extend out at a 90-degree angle from the plane 55 (FIG. 7) of the plate 22.

The forearms 68, 70, 78 and 80 have a width at least great enough such that the arms 60, 62, 64 and 66, are capable of supporting the cables 26. The forearms 68, 70, 78 and 80 are spaced apart and are also long enough such that the slots 56 and 58 are large enough to accommodate an operable amount of cables 26. Thus, the length of the forearms 68, 70, 78 and 80, and the length of the back portions 61 and 65 of the slots 56 and 58, for example, can be modified to accommodate the amount of cables 26 to be managed.

FIG. 8 illustrates, in the present example, that the forearms 68, 70, 78 and 80 (FIG. 7) each have respective fingers 72, 74, 82 and 84. The fingers 72, 74, 82 and 84 are integrally attached to the ends of the forearms 68, 70, 78 and 80 (FIG. 7) at approximately a 90-degree angle (see FIG. 3). It should be noted, however, that the fingers 72, 74, 82 and, 84, could extend from the forearms 68, 70, 78 and 80 (FIG. 7) in other operable angles. For example, the fingers 72, 74, 82 and 84, could extend straight out from the forearms, 68, 70, 78 and 80 (FIG. 7) or at an angle operably greater than 90-degrees.

FIG. 8 shows that fingers 74 and 84 themselves are L-shaped with upward extending portion 69 and 71. The forearms 70 and 80 (FIG. 7) act as a tray that supports the cables 26 (FIG. 11), and the fingers 74 and 84, which, in the present example, have upward extending portions 69 and 71, that catch and partially hold the cables 26 (FIG. 11) prior to the lock bar 30 (FIG. 3) being attached to the slot arrangement 28. Of course, these fingers 74 and 84 could be other operable shapes. In the embodiment illustrated, the upward extending portions 69 and 71 helps hold the cables 26 in the slots 56 and 58 when the lock bar 30 (FIG. 3) is not attached.

Attention is now drawn to FIG. 9, which shows fingers 72 and 82. FIG. 9 shows that finger 72 has a first edge 90, a second edge 91, a third edge 92, a fourth edge 93, a fifth edge 94, a sixth edge 95, a seventh edge 96. In the embodiment shown, edge 93 is perpendicular to edge 90 and extends towards, but not to, edge 91. Perpendicular to edge 93 is edge 94, which extends to and is perpendicular to edge 96. Edge 96 extends parallel to edge 93 and away from edge 91, but is shorter than edge 93. Thus, in the embodiment shown, edges 93, 94 and 96, in combination, form a J-shaped hook 76 that selectively holds the hook-receiving windows, 38 or 40 of the lock bar 30. Edge 95, which is between edges 90 and 91, extends parallel to edges 90 and 91 and extends to edge 92. Edge 92 is perpendicular to edge 95 and extends to and is perpendicular to edge 91.

Attention is now drawn to FIG. 10, which shows the finger 82 of arm 64. Finger 82 also has hook portions 86 and 53 made to hold the hook-receiving window 40 or 38 of the lock bar 30. Finger 82 is substantially rectangular in shape. Finger 82 has a first edge 97, a second edge 98 at third edge 99, a fourth edge 100, a fifth edge 101, a sixth edge 102, a seventh edge 103, an eighth edge 104, a ninth edge 105, a tenth edge 106, an eleventh edge 107 and two rounded corners 108 and 109.

In the embodiment shown, edge 97 is opposite and parallel to edge 98. Edge 97 and edge 99 form one continuous edge through the rounded corner 108, such that edge 97, 99 and corner 108 form an L-shape where the edges 99 and 97 are perpendicular. Similarly, edge 98 and edge 100 form one continuous edge though the rounded corner 109, such that edge 98, 100 and corner 109 form an L-shape where edges 98 and 100 are perpendicular.

Edge 102 extends from edge 100 to edge 104 and is perpendicular to both edges 104 and 100. Edge 104 extends to and is perpendicular to edge 107. Opposite edge 102 is edge 101. Between edge 101 and 102 is a gap 110. Edge 101 extends from edge 99 to edge 103 and is perpendicular to both edges 99 and 103. Edge 103 extends to and is perpendicular to edge 105. Thus, in the embodiment shown, edges 100, 102, 104 and 107 are mirror images of edges 99, 101, 103 and 105. Edges 105 and edges 107 extend to and are perpendicular to edge 106. Extending the length of edge 106, edges 105 and 107 are spaced apart such that between them is a void 111. Thus, in the embodiment shown, edges 106, 107 and 104, in combination, form a J-shaped hook 86 that selectively holds the hook-receiving windows, 38 or 40 of the lock bar 30. Further, edges 103, 105 and 106 in combination form another J-shaped hook 53 that helps keep the lock bar 30 in place. Together, hook 86 and hook 53 resembles a C-shape. The C-shaped finger 82 with hooks 87 and 53 allow the lock bar 30 to be attached more securely than if fingers 72 and 82 only had hooks, such as 76. For example, because gravity holds the lock bar 30 on the hooks 76 and 86, the C-shape finger 82 would stop the lock bar 30 from being lifted vertically off the slot arrangement. If both fingers 72 and 82 had hooks, such as 76, the lock bar 30 could be lifted vertically from the slot arrangement 28.

The other slots 42–47 (FIGS. 3 and 7) are constructed analogously to slot 56, in the illustrated embodiment, except that the arms that define slots 42–47 each are identical to arm 62. As such, each of the slots 42–47 includes an arm pair 180 (FIG. 7). It should be noted that the slots 56, 42–47, and 58 are oriented next to one another such that adjacent slots share one arm of the arm pairs 180. For example, slot 56 and slot 42 share arm 62, while slots 42 and 43 share arm 41. In other embodiments, the slots 42–47 may include arms similar to arm 60 including a hook 76.

E. Example System, FIGS. 1, 2 and 11

The plate 22 defining the slot arrangement 28 is useable in many types of arrangements. As previously mentioned, in the illustrated embodiment, two plates 21 and 22 are used in the example chassis 24. Referring to FIGS. 1 and 2, the chassis 24 includes two plates 21 and 22, a bracket 120, connecter ports 128 (FIG. 2), a power supply bar 127, a module 121, module receiving bars 122 and 123, module-receiving slots 124 and 125 and mounting sections 27 and 126. The module 121 has coax cable connectors 129. The module receiving bars 122 and 123, the bracket 120, and the power supply bar 127 connects the two plates, 21 and 22 together. The card 121 is received and held by the module-receiving slots 124 and 125. The power supply bar 127 covers the connector ports 128. An example of such a system is shown in U.S. Pat. No. 6,289,210 B1, which is incorporated herein by reference. The plates 21 and 22 define the slot arrangement 28, which holds the cables 26 (FIG. 11). The lock bar 30 is selectively placed and held on the slot arrangement 28 to trap the cables 26 (FIG. 11).

F. Methods of Use

In operation, a person would use the arrangements described herein as follows. Cables, such as cables 26, to be held are oriented in the slots 56, 42–47, and/or 58 of the plate 22. As described above, the slots 56, 42–47, and 58 are open slots; thus, it is desirable to close the slots 56, 42–47, and 58 after positioning the cables 26. Orienting the lock bar 30 over the plate 22 closes the slots 56, 42–47, and 58. In particular, at least one of the hooks 76, 53 extending from the plate 22 is inserted through one of the windows 38, 40. In preferred methods, both hooks 76, 53 are inserted through one of the respective windows 38, 40, and hook 53 is inserted first so as to allow the bight section 36 to pass through the gap 110 and rest on hook 86. Thus, in preferred methods, the hooks 76 and 53 are inserted through the hook-receiving windows 38 and 40 respectively. The lock bar 30 is angled with respect to the slot arrangement 28 such that hook 53 is inserted into hook-receiving window 40 first by moving the bight section 36 that is adjacent both the hook-receiving window 40 and the end of the lock bar 30 through the gap 110 and then rotating the lock bar 30 such that hook 76 is received by hook-receiving window 38. This secures the lock bar 30 over the slot arrangement 28 on the plate 22, and thereby helps to secure the cables 26 in place within the slots (in the example shown in FIG. 11, the cables 26 are secured in slots 56 and 58).

To service the chassis 24, it may be desirable from time-to-time to manipulate the cables 26, including removing them from the slot arrangement 28. In such a situation, the lock bar 30 is removed from the slot arrangement 28 by moving the hook-receiving windows 38 and 40 away from the edges 107 and 94 (FIG. 9) respectively until the hook-receiving windows 38 and 40 are removed from hooks 76, 86 and 53. As shown in FIGS. 10 and 3, the bight section 36 passes through the gap 110 freeing the lock bar 30 from the slot arrangement 28. As shown in FIGS. 9 and 3, when the hook-receiving window 38 of the lock bar 30 extends above edge 96 it can be slid away from the hook 76 and removed from the slot arrangement 28. In the preferred method, hook-receiving window 38 is removed from hook 76 first, and then the lock bar 30 is pivoted in void 111 until the bight section 36 can be removed through the gap 110; thus freeing the lock bar 30 from the hooks 86 and 53. The gap 110, however, could be large enough such that the bight section 36, adjacent both the hook receiving window 40 and the end of the lock bar 30, could fit through the gap 110 thus; the lock bar 30 could be removed by moving the lock bar 30 away from edges 107 and 94 until the lock bar 30 could be slid away with out rotating the lock bar 30.

Once the lock bar 30 is removed, the cables 26 (FIG. 11) needing management are placed in the appropriate slot of slots 56, 42–47 and 58. The lock bar 30 may then be positioned such that the hook-receiving windows 40 or 38 align with the hooks 76 and 86 of the slot arrangement 28, and the lock bar 30 is attached to the slot arrangement 28 in the reverse order that it was taken off, as described above.

The above specification provides a complete description of example embodiments of principles of the invention. Many embodiments can be made.

What is claimed is:

1. A cable management arrangement comprising:
   (a) a first plate having an end portion; the end portion defining a first and a second open-ended slot; each of the first and second slots being defined by respective first and second spaced-apart arms;
      (i) the first arm of the first slot having a forearm and a finger; the finger being angled relative to the forearm;
         (A) the first arm finger defining a first slot hook;
      (ii) the first arm of the second slot having a second slot first arm forearm and a second slot first arm finger; the second slot first arm finger being angled relative to the second slot first arm forearm;
         (A) the second slot first arm finger defining a second slot hook; and
   (b) a lock bar in selective removable engagement with the end portion of the plate to close the first and second open-ended slots; the lock bar comprising:
      (i) an integral, single piece U-shaped construction including first and second legs joined by a bight section; the bight section defining at least first and second windows;
         (A) said first slot hook extending into and being received by said first window;
         (B) said second slot hook extending into and being received by said second window; and
         (C) said first and second legs enclosing the first slot first arm finger and the second slot first arm finger.

2. An arrangement according to claim 1 wherein:
   (a) the second arm of the first slot has a forearm and a finger; the first slot second arm finger being angled 70–110° relative to the first slot second arm forearm;
   (b) the second arm of the second slot has a forearm and a finger; the second slot second arm finger being angled 70–110° relative to the second slot second arm forearm;
   (c) said first and second legs enclose at least the first slot first and second arm fingers, and the second slot first arm finger.

3. An arrangement according to claim 2 wherein:
   (a) the second slot first arm finger defines a pair of second slot hooks; one of the second slot hooks supporting an end of the lock bar and the other of the second slot hooks extending through the second window.

4. An arrangement according to claim 2 wherein:
   (a) the end portion defines a plurality of mid-section open-ended slots between said first open-ended slot and said second open-ended slot; each of said plurality of mid-section open-ended slots including a forearm and a finger angled 70–110° relative to the forearm;
      (i) said lock bar closing each of said plurality of mid-section slots; and
      (ii) said first and second legs enclosing each of the fingers of said plurality of mid-section slots.

5. An arrangement according to claim 4 further including:
   (a) a plurality of cables being oriented in at least some of the first slot, second slot, and mid-section slots.

6. An arrangement according to claim 4,
   (a) wherein said first plate is part of a chassis; the chassis including a second plate including an end portion defining a plurality of open-ended slots; and (b) further comprising a second lock bar in selective removable engagement with said second plate end portion to close the second plate end portion plurality of slots.

7. An arrangement according to claim 4 further including:
 (a) a plurality of cables held by said chassis; the cables being oriented in at least some of the first slot, second slot, and mid-section slots of said first plate; and in at least some of the slots of the second plate.

8. An arrangement according to claim 4 wherein:
 (a) said second plate is spaced from, and parallel to, said first plate.

9. A method of managing cables; the method comprising:
 (a) providing a plate defining a plurality of open-ended slots;
 (b) orienting at least one cable in one of the slots; and
 (c) closing the plurality of open-ended slots to trap the at least one cable therein by orienting a U-shaped lock bar over the plate; the U-shaped lock bar having a bight section; the bight section defining at least one hook-receiving window;
  (i) the step of orienting a lock bar over the plate including inserting a hook extending from the plate through the at least one hook-receiving window defined by the bight section of the lock bar.

10. A method according to claim 9 wherein:
 (a) the step of inserting a hook extending from the plate through the at least one hook-receiving window defined by the bight section of the lock bar includes inserting first and second hooks extending from the plate through a pair of hook-receiving window defined by the bight section of the lock bar.

11. A method according to claim 10 wherein:
 (a) the step of inserting first and second hooks extending from the plate through a pair of hook-receiving windows in the lock bar includes inserting first and second hooks extending from the plate through a pair of hook-receiving windows in the bight section adjacent to opposite ends of the U-shaped lock bar.

12. A cable management arrangement comprising:
 (a) a plate having an integral portion; the integral portion defining an at least one open-ended slot; each of the at least one slot being defined by respective first and second integral spaced-apart arms;
  (i) the spaced apart arms having an integral hook;
 (b) a lock bar in selective removable engagement with the end portion of the plate to close the at least one open-ended slot; the lock bar comprising:
  (i) an integral, single piece construction having a bight section; the bight section defining at least one window;
   (A) said at least one hook extending into and being received and held by said at least one window.

13. The cable management arrangement as in claim 12, wherein the lock bar is an integral U-shaped construction including:
 (i) a first elongated leg;
 (ii) a second elongated leg extending parallel to said first leg;
 (iii) the bight section joining said first elongated leg and said second elongated leg to define the U-shaped construction.

14. The cable management arrangement as in claim 12, wherein the lock bar is an integral elongate lumen having first and second opposite ends.

15. The cable management arrangement as in claim 12, wherein the lock bar is an integral rectangular bar.

16. A method of managing cables; the method comprising:
 (a) providing a plate defining a plurality of open-ended slots;
 (b) orienting at least one cable in one of the slots; and
 (c) closing the plurality of open-ended slots to trap the at least one cable therein by orienting a U-shaped lock bar over the plate;
  (i) the step of orienting a lock bar over the plate including inserting a hook extending from the plate through an aperture in the lock bar;
  (ii) the step of inserting a hook extending from the plate through an aperture in the lock bar including inserting first and second hooks extending from the plate through a pair of apertures in the lock bar; and
  (iii) the step of inserting first and second hooks extending from the plate through a pair of apertures in the lock bar including inserting first and second hooks extending from the plate through a pair of apertures in a bight section adjacent to opposite ends of the U-shaped lock bar.

* * * * *

UNITED STATES PATENT AND TRADEMARK OFFICE
CERTIFICATE OF CORRECTION

PATENT NO. : 6,734,354 B2
DATED : May 11, 2004
INVENTOR(S) : McClellan et al.

It is certified that error appears in the above-identified patent and that said Letters Patent is hereby corrected as shown below:

Column 9,
Lines 5 and 10, delete "4" and insert -- 6 --.

Signed and Sealed this

Thirtieth Day of November, 2004

JON W. DUDAS
*Director of the United States Patent and Trademark Office*